US008547925B2

(12) United States Patent
Wu

(10) Patent No.: US 8,547,925 B2
(45) Date of Patent: Oct. 1, 2013

(54) TRANSMISSION METHOD, SYSTEM, TRANSMITTER, RECEIVER AND METHOD FOR REALIZING INFORMATION TRANSMISSION

(75) Inventor: Xuyong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 688 days.

(21) Appl. No.: 12/487,881

(22) Filed: Jun. 19, 2009

(65) Prior Publication Data

US 2009/0257424 A1 Oct. 15, 2009

Related U.S. Application Data

(63) Continuation of application No. PCT/CN2007/071282, filed on Dec. 20, 2007.

(30) Foreign Application Priority Data

Dec. 20, 2006 (CN) .......................... 2006 1 0157986

(51) Int. Cl.
*H04W 4/00* (2009.01)
*H04B 1/06* (2006.01)

(52) U.S. Cl.
USPC ........................................... 370/330; 455/231

(58) Field of Classification Search
None
See application file for complete search history.

(56) References Cited

U.S. PATENT DOCUMENTS

| 2002/0093929 | A1* | 7/2002 | Mangold et al. | 370/336 |
|---|---|---|---|---|
| 2003/0124977 | A1* | 7/2003 | Smith et al. | 455/16 |
| 2004/0258042 | A1* | 12/2004 | Kauhanen | 370/350 |
| 2005/0286408 | A1* | 12/2005 | Jin et al. | 370/208 |
| 2008/0039107 | A1* | 2/2008 | Ma et al. | 455/450 |
| 2008/0212462 | A1* | 9/2008 | Ahn et al. | 370/209 |
| 2009/0122765 | A1* | 5/2009 | Dimou et al. | 370/336 |
| 2009/0252115 | A1* | 10/2009 | Breuer | 370/331 |

FOREIGN PATENT DOCUMENTS

| CN | 1458772 A | 11/2003 |
|---|---|---|
| CN | 1747594 | 3/2006 |
| CN | 1863345 | 11/2006 |

(Continued)

OTHER PUBLICATIONS

International Preliminary Report on Patentability, mailed Jun. 24, 2009, in corresponding PCT Application No. PCT/CN2007/071282 (6 pp.).

(Continued)

*Primary Examiner* — Eunsook Choi
(74) *Attorney, Agent, or Firm* — Staas & Halsey LLP

(57) ABSTRACT

A transmission method includes: confirming a reference time; according to the bit property of the data to be transmitted and the reference time, inserting the time slice signal into a special time position of a data frame; transmitting the data frame in which the time slice signal has been inserted and the time slice signal. And a method for realizing information transmission includes: according to the information unit to be transmitted, the transmitter sets the time parameters of the signal transmission during a special time period; the receiver receives the information unit according to the property of the received signal in a determined time period. This invention also provides a transmission system, a transmitter and a receiver. This invention can transmit signaling and messages among multiple systems, in order to solve the signaling interaction problem in the processes of coexisting negotiation and quick switching of the multi-mode terminal in a multi-system or a mixed type network.

9 Claims, 12 Drawing Sheets

(56) References Cited

FOREIGN PATENT DOCUMENTS

| | | |
|---|---|---|
| EP | 0794642 A2 | 9/1997 |
| JP | 2002026888 | 1/2002 |
| WO | 99/35780 | 7/1999 |
| WO | 02/067458 | 8/2002 |

OTHER PUBLICATIONS

First Office Action, mailed Dec. 18, 2009, in corresponding Chinese Application No. 200610157986.9 (26 pp.).

Extended European Search Report, mailed Jun. 28, 2010, in corresponding European Application 07846108.4.

Chinese Office Action mailed Sep. 1, 2011 issued in corresponding Chinese Patent Application No. 200610157986.9.

Chinese Office Action issued Dec. 16, 2011 in corresponding Chinese Patent Application No. 200610157986.9 (8 pages) (13 pages English translation).

Chinese Office Action Issued Mar. 22, 2012 in corresponding Chinese Patent Application No. 200610157986.9 (6 pages) (11 pages English translation).

Rejectiion Decision, mailed Jun. 4, 2012, in corresponding Chinese Application No. 200610157986.9 (19 pp.).

\* cited by examiner

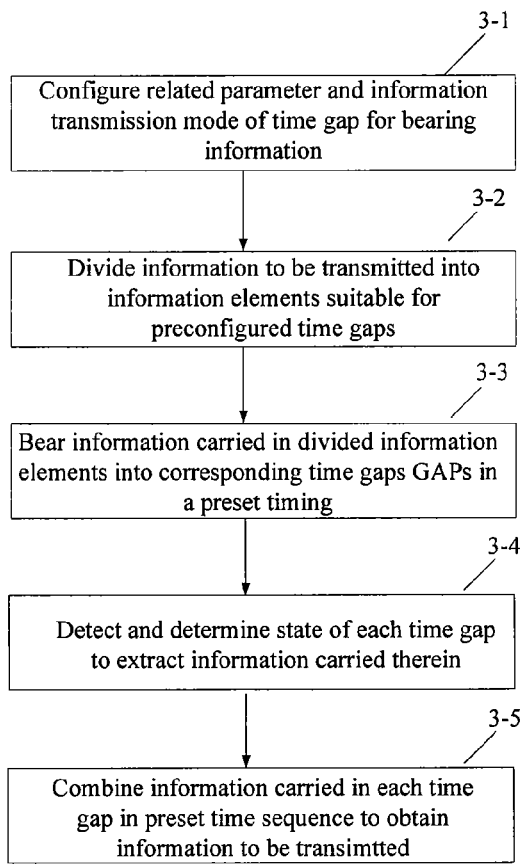
Fig. 3
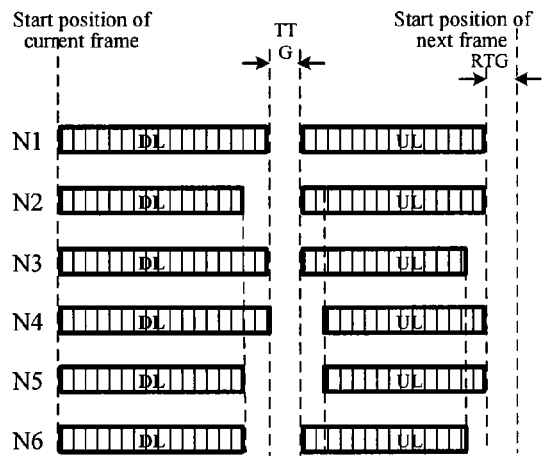
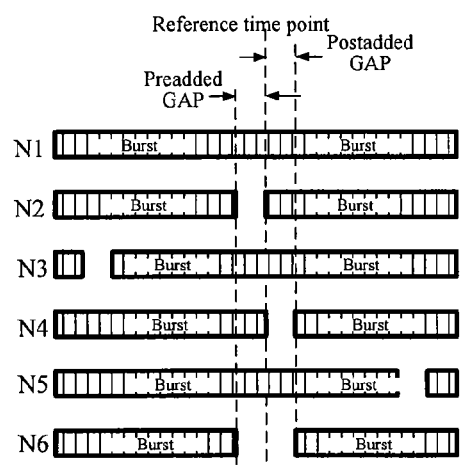
Fig. 4-A
Fig. 4-B

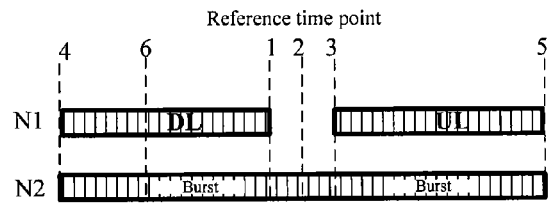
Fig. 4C
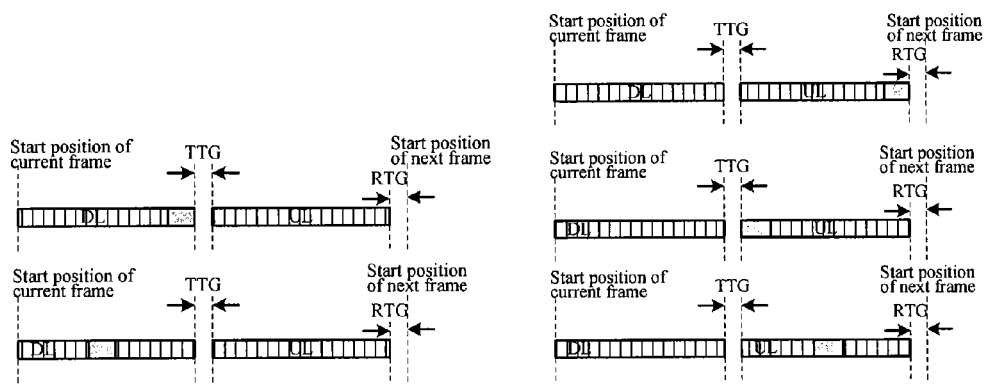
Fig. 5-A
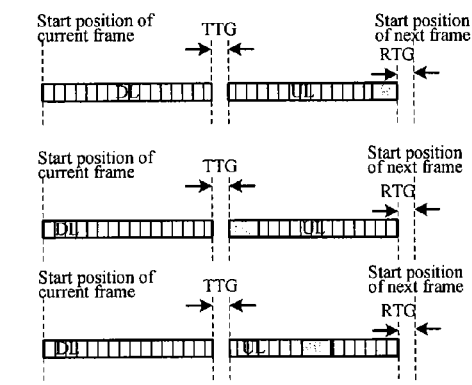
Fig. 5-B
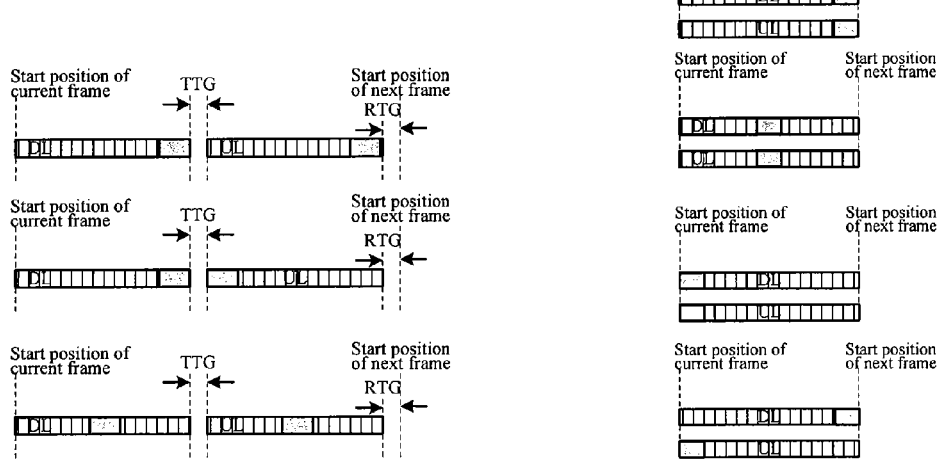
Fig. 5-C
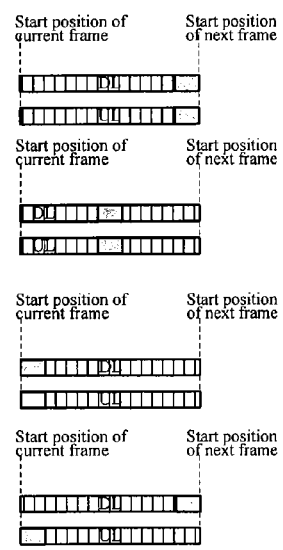
Fig. 5-D

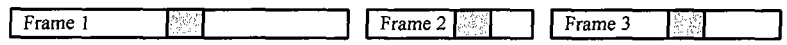
Fig. 5-E
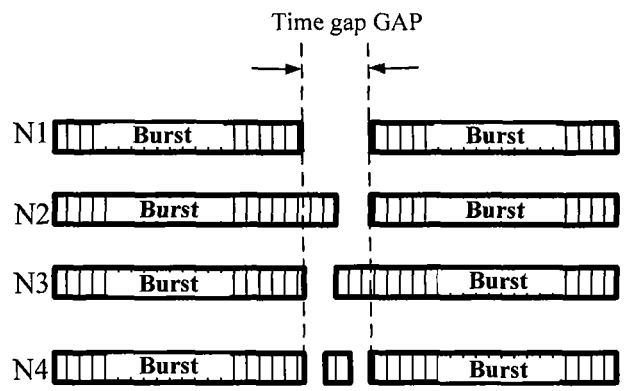
Fig. 6-A
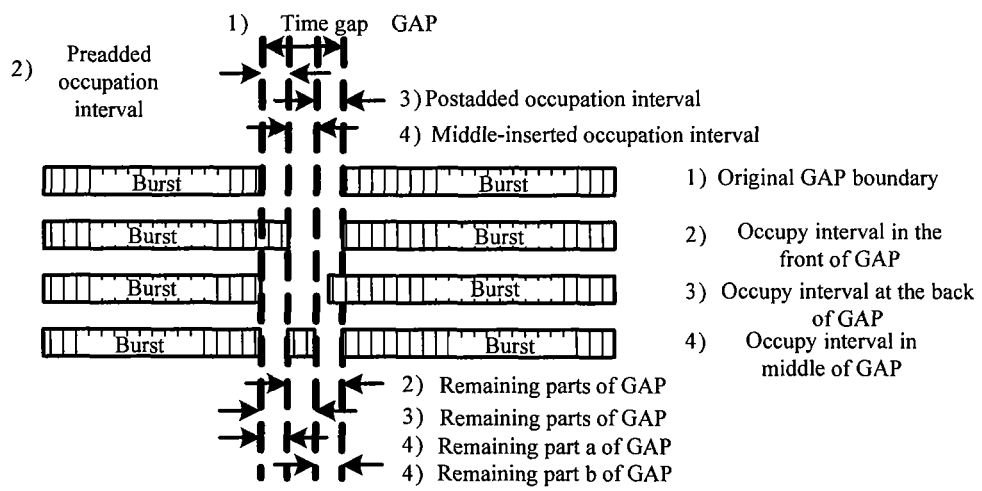
Fig. 6-B

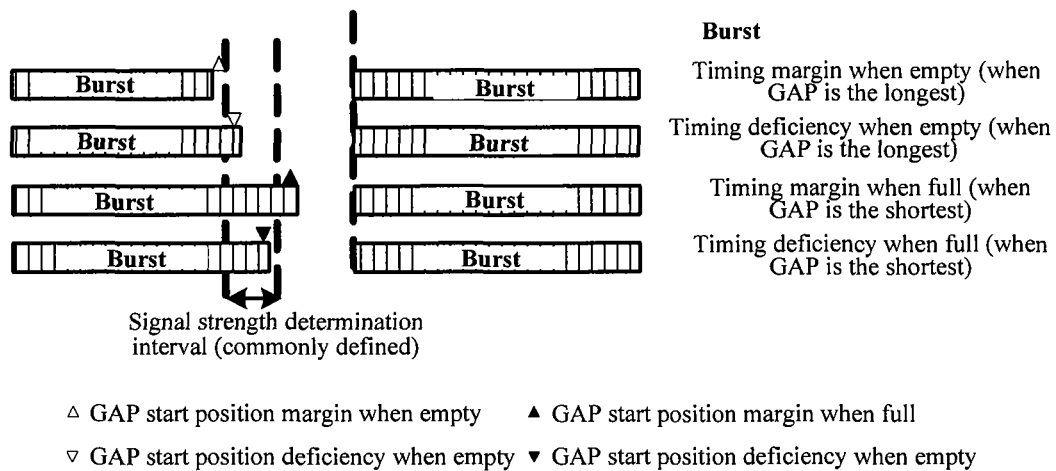
Fig. 7-A
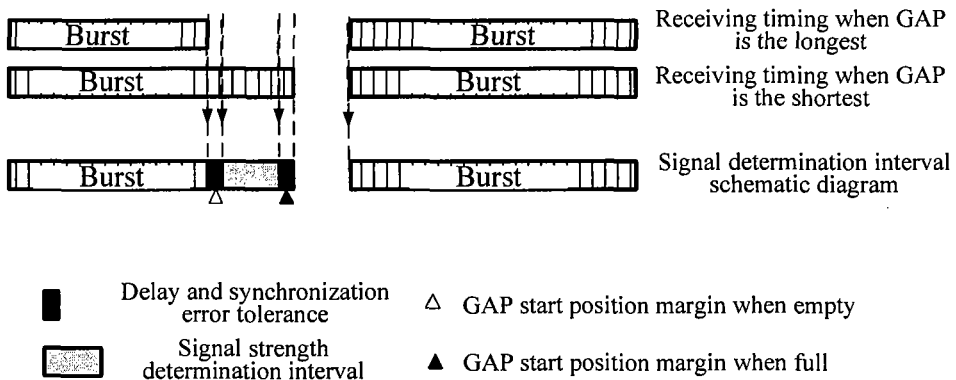
Fig. 7-B
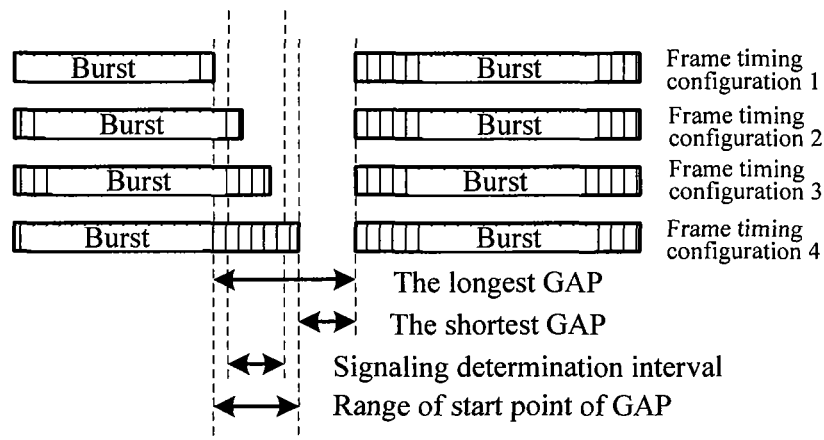
Fig. 7-C

N1
- GAP setting 1 (0 sym/chip)
- GAP setting 2 (1 sym/chip)
- Illustration representation N2
- GAP setting 1 (1 sym/chip)
- GAP setting 2 (2 sym/chip)
- Illustration representation N3
- GAP setting 1 (1 sym/chip)
- GAP setting 2 (2 sym/chip)
- GAP setting 3 (3 sym/chip)
- GAP setting 4 (4 sym/chip)
- Illustration representation N4
- GAP setting 1 (1 sym/chip)
- GAP setting 2 (2 sym/chip)
- GAP setting 3 (3 sym/chip)
- GAP setting 4 (4 sym/chip)
- Illustration representation N5
- GAP setting 1 (1 sym/chip)
- GAP setting 2 (2 sym/chip)
- Illustration representation □ Continuously transmitted symbol/code chip
▨ Symbol/code chip for changing GAP

Fig. 10

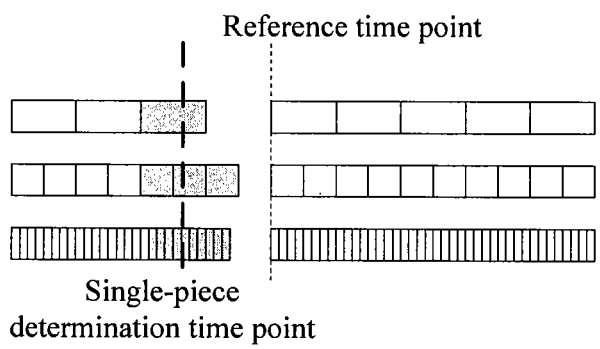

Fig. 11-A

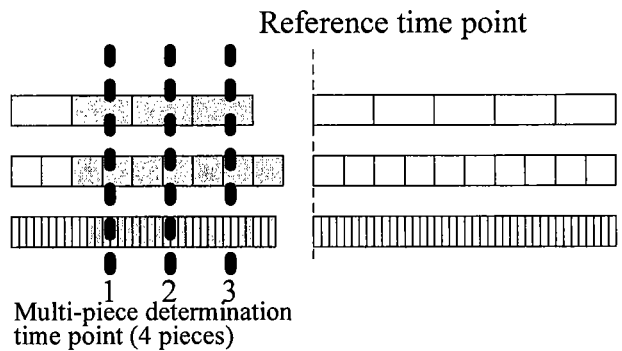
Fig. 11-B
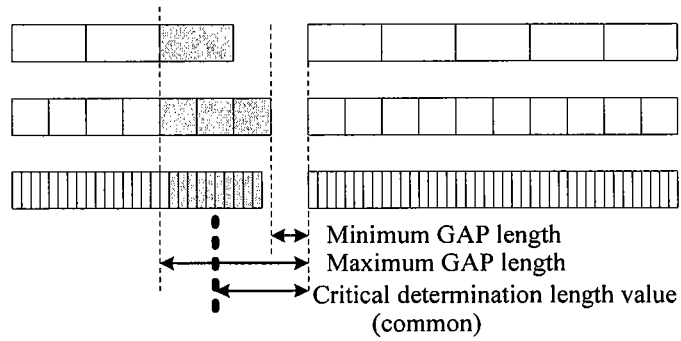
Fig. 11-C
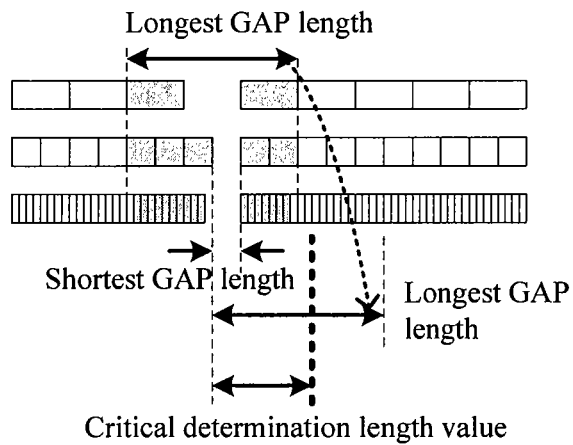
Fig. 11-D

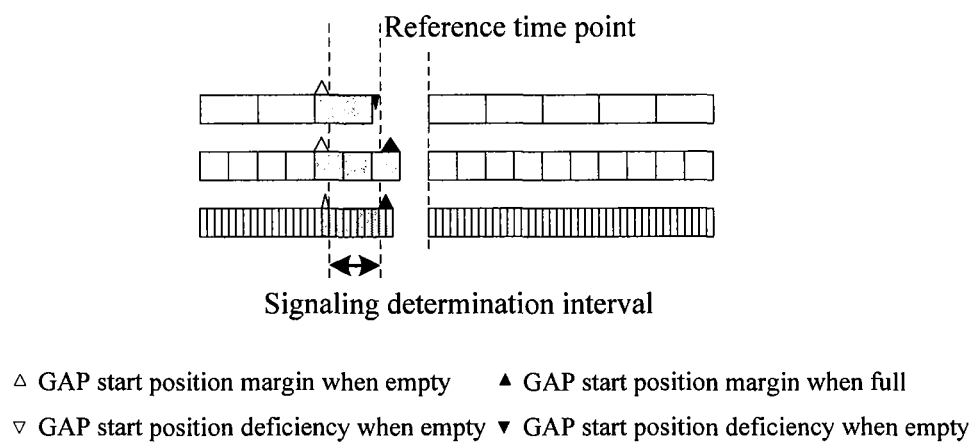
△ GAP start position margin when empty ▲ GAP start position margin when full
▽ GAP start position deficiency when empty ▼ GAP start position deficiency when empty
Fig. 11-E
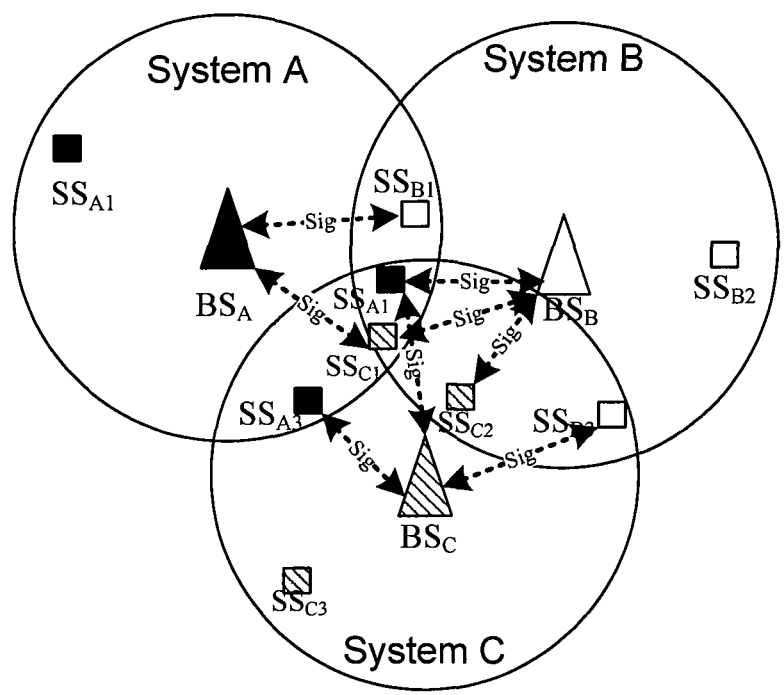
Fig. 12

TRANSMISSION METHOD, SYSTEM, TRANSMITTER, RECEIVER AND METHOD FOR REALIZING INFORMATION TRANSMISSION

CROSS-REFERENCE TO RELATED APPLICATIONS

This application is a continuation of International Patent Application No. PCT/CN2007/071282, filed on Dec. 20, 2007, which claims priority to Chinese patent application No. 200610157986.9, filed on Dec. 20, 2006, both of which are incorporated herein by reference in their entireties.

FIELD OF THE INVENTION

The present invention relates to the communication field, and more particularly, to a transmission method, a transmission system, a transmitter, a receiver and a method for realizing information transmission.

BACKGROUND OF THE INVENTION

Information transmission between systems of different technologies or information transmission between terminals at different modes of access points or base stations has always been a technical difficulty.

FIG. 1 illustrates a system A and a system B which are wireless communication access systems, and system A and system B each include Subscriber Stations (SSs) and a Base Station (BS). The system A includes an $SS_{A1}$, an $SS_{A3}$ and a $BS_A$. The system B includes an $SS_{B1}$, an $SS_{B2}$, an $SS_{B3}$ and a $BS_B$. The systems A and B each may be one of the following systems: a Time-Division Duplex-Code Division Multiple Access (TDD-CDMA) system, a Universal Terrestrial Radio Access-Time Division Duplex (UTRA-TDD) system, a Time Division Duplex-Synchronous Code Division Multiple Access (TDD-SCDMA) system, The third Generation Mobile Telecommunication (3G) system, a World Interoperability for Microwave Access (WiMAX) system, a Wireless Broadband Access Service (WiBro) system, a Wireless High-speed Unlicensed Metropolitan Area Network (WirelessHuman) system, a Wireless Fidelity (WiFi) system, a High Performance Radio Local Area Network (HiperLAN) system, a High Performance Radio Metropolitan Area Network (HiperMAN) system, a Radio Access Network (RAN) system, a Wireless Metropolitan Area Network (WMAN) system, a Wireless Local Area Network (WLAN) system, a Mobile Broadband Wireless Access (MBWA) system, a Beyond the third Generation Mobile Telecommunication (B3G) system and other subsequently developed wireless communication access systems.

FIG. 2 illustrates a system C and a system D which are wire communication access systems, for example, copper wire access systems (e.g., a cable, a PLC, or a Digital Subscriber Line, DSL), optical access systems (e.g., XPON) and other subsequent wire access technologies using a sharing medium as the media such as Point to Multi Point (PMP) or MESH).

In many cases, the access systems as shown in FIG. 1 and FIG. 2 need to communicate information with each other. For example, a specific parameter needs to be negotiated to remove or reduce interference between the systems, and communication of control information is needed when a terminal makes handoff between different types of systems.

Consequently, in many cases, no matter a wire access system or a wireless access system needs to know information of an access system which is adjacent to the wire or wireless access system and influences and is influenced by the wire or wireless access system. This is achieved through upper-layer information communication in conventional solutions by connecting the respective networks of the systems to a public network. However, in the conventional solutions, the systems cannot communicate with each other directly via a lower-layer network and different network types of systems especially cannot obtain corresponding information via direct communication.

SUMMARY OF THE INVENTION

Accordingly, embodiments of the present invention provide a transmission method, a transmission system, a transmitter, a receiver and a method for realizing information transmission, so as to solve the signaling communication difficulty during data transmission in multiple systems or a hybrid network.

To achieve the above object, an embodiment of the present application provides a transmission system including at least a transmitter and a receiver, wherein the transmitter is configured to determine a reference time, insert a time slice signal into a data frame according to the reference time, and transmit the data frame and the time slice signal; and the receiver is configured to determine a reference time corresponding to the transmitter, and after receiving the data frame and the time slice signal, detect a state parameter of the time slice signal and parse the data frame according to the state parameter.

An embodiment of the present invention also provides a transmitter, including:

a time device, configured to determine the reference time;

a time slice generation device, configured to insert the time slice signal into a particular time position in the data frame according to a bit property of data to be transmitted and the reference time; and a transmitting device, configured to transmit the data frame in which the time slice signal is inserted and the time slice signal.

An embodiment of the present invention also provides a receiver, including:

a first time device, configured to determine the reference time corresponding to the transmitter;

a time slice detection device, configured to receive a data frame in which a time slice signal is inserted and the time slice signal transmitted from the transmitter, and detect a state parameter of the time slice signal; and a determination device, configured to parse the data frame according to the detected state parameter of the time slice signal.

The present invention also provides a transmission method, including:

determining a reference time;

inserting a time slice signal into a particular time position in a data frame according to a bit property of data to be transmitted and the reference time; and transmitting the data frame in which the time slice signal is inserted and the time slice signal.

The present invention also provides a method for realizing information transmission including:

setting, by a transmitting party, a signal transmitting time parameter in a particular time period according to a information element to be transmitted; and receiving, by a receiving party, the information element in the particular time period according to a property of a received signal.

From the above solutions it can be seen that in the embodiments of the present invention, the receiving party needs not to consider the modulation method, the modulation frequency and the coding scheme of the received signal, and there is no strict requirement on the synchronization and propagation delay of the devices of the system. It is possible to communicate signaling or information between multiple systems according to the embodiments of the present invention, so as to solve the signaling communication difficulty during coexisting negotiation and quick switching of multi-mode terminals in a multi-system or a hybrid network. The embodiments of the present invention can also facilitate the network optimization and mergence between various wireless networks and between wire networks using the same type of sharing medium for the future.

BRIEF DESCRIPTION OF THE DRAWINGS

FIG. 3 is a flow chart of a method for transferring information using GAP according to an embodiment of the present invention.

FIG. 4-A is an example of a signal bearing gap in a TDD data frame according to an embodiment of the present invention.

FIG. 4-B is an example of a signal bearing gap defined with respect to a reference time point according to an embodiment of the present invention.

FIG. 4-C is an example of selecting a reference time point according to an embodiment of the present invention.

FIG. 5-A is an example of a signal bearing gap in a downlink TDD data frame according to an embodiment of the present invention.

FIG. 5-B is an example of a signal bearing gap in an uplink TDD data frame according to an embodiment of the present invention.

FIG. 5-C is an example of a signal bearing gap in a downlink TDD data frame and an uplink TDD data frame according to an embodiment of the present invention.

FIG. 5-D is an example of a signal bearing gap in an uplink FDD data frame according to an embodiment of the present invention.

FIG. 5-E is an example of a signal bearing gap in a competition-based TDD data frame according to an embodiment of the present invention.

FIG. 6-A is an example of changing the state of a GAP to bear information according to an embodiment of the present invention.

FIG. 6-B is an example of a method equivalent to changing the state of a GAP to bear information according to an embodiment of the present invention.

FIG. 7-A is an example of determining information in a signal bearing GAP with respect to signal strength in a signal strength determination interval according to an embodiment of the present invention.

FIG. 7-B is a schematic diagram of empty-full double-value GAP detection by using a signal strength determination interval according to an embodiment of the present invention.

FIG. 7-C is a schematic diagram of multi-value GAP detection by using a signal strength determination interval according to an embodiment of the present invention.

FIG. 10 is an illustration of a method for transferring information between multiple systems according to an embodiment of the present invention.

FIG. 11-A illustrates transferring information between hybrid systems by using a GAP start position value according to an embodiment of the present invention.

FIG. 11-B illustrates transferring information between hybrid systems by using a GAP start position value according to an embodiment of the present invention.

FIG. 11-C illustrates transferring information between hybrid systems by using GAP length setting and determination according to an embodiment of the present invention.

FIG. 11-D illustrates transferring information between hybrid systems by using GAP length setting and determination according to an embodiment of the present invention.

FIG. 11-E illustrates transferring information between hybrid systems by using GAP start point setting and signal strength detection and determination according to an embodiment of the present invention.

FIG. 12 is a diagram illustrating an application example in a wireless neighborhood system according to an embodiment of the present invention.

DETAILED DESCRIPTION OF THE EMBODIMENTS

Figure 1:
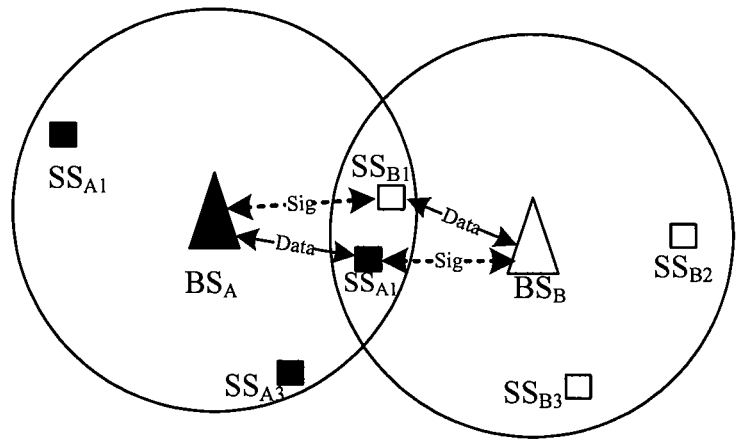
FIG. 1 is a schematic diagram of a wireless neighborhood system in the prior art.
Figure 2:
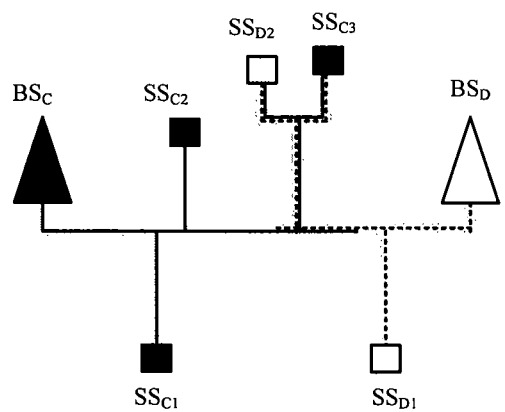
FIG. 2 is a schematic diagram of a wire neighborhood system in the prior art.

An embodiment of the present invention provides a method for transferring information between multiple systems sharing media resources. The method includes: at a transmitting party, bearing information by using a particular time position and/or a variable state property of transmission power or strength in a time interval; and at a receiving party, parsing received information by using a particular time position and/ or a state property of detected power or strength variation in a time interval. The state property may be the existence or inexistence of power or strength, and may also be variation of specific power or strength value. By using this method, the receiving party, after receiving the information transmitted by the transmitting party, can parse data out as long as it detects the existence or inexistence of signal power or strength at a determined time position or detect that the received signal power is different from the time interval of a frame timing of the received signal power or strength corresponding to normal data. Therefore the receiving party needs not to consider the modulation method, the modulation frequency and the coding scheme of the received signal, and there is not a strict requirement on the synchronization and propagation delay of the devices of the system. It can be seen that, with the method according to the embodiments of the present invention, it is possible to communicate signaling or information between multiple systems, so as to solve the signaling communication difficulty during coexisting negotiation and quick switching of multi-mode terminals in a multi-system or a hybrid network. The embodiments of the present invention can also facilitate the network optimization and mergence between various wireless networks and between wire networks using the same type of sharing medium for the future.

An embodiment of the present invention provides a transmission method. The method is applicable to be used in a transmitting terminal. The method includes:

determining a reference time;

inserting a time slice signal into a particular time position in a data frame according to a bit property of data to be transmitted and the reference time; and transmitting the data frame in which the time slice signal is inserted and the time slice signal.

Preferably, the method further includes: controlling a state parameter of the time slice signal according to the bit property of the data to be transmitted so as to represent the data. The state parameter of the time slice signal includes at least one of the followings: a position of an insertion time or a position of a boundary point, a length of a time slice, and a filling state of the time slice.

Preferably, the method further includes: detecting, by a receiving party, a state parameter of the time slice signal when receiving the data frame in which the time slice signal is inserted and the time slice signal; and parsing the data frame according to the detected state parameter of the time slice signal. If the data parsed out as sub-blocks, the method further includes: combining the data sub-blocks parsed out into complete data according to a timing.

Specifically, in a transmission system, a reference time is determined in a data frame or at a boundary of the data frame, and a time slice signal is inserted into the data frame at a particular time position of the reference time. Then the data frame in which the time slice signal is inserted and the time slice signal are transmitted to a receiving terminal. Here information is represented by changing the strength value of the signal in the time slice and/or a parameter of the time slice such as the time position of the time slice and/or the time length of the time slice. The time slice signal may be used to transmit information to be communicated between multiple systems or a signaling message to be communicated between the same systems.

The reference time may be determined according to a frame head or a frame tail of the data frame. The reference time may also be determined by the synchronization of the transmitting terminal and the receiving terminal, for example, according to a synchronization clock for the transmitting and receiving terminals and/or the time synchronization transmitted by the transmitting terminal to the receiving terminal.

The position where the time slice is inserted in the data frame includes: a boundary of the data frame and/or the middle of the data frame.

Considering that each time slice can bear limited amount of information, the complete data to be transmitted may be divided into multiple data sub-blocks according to the information capacity of each time slice such as one bit or a combination of at least one bit. The multiple data sub-blocks may be inserted into corresponding data frames according to a timing. At the receiving party, the detected information borne in the time slices may be combined according to a corresponding timing so as to recover the complete data.

To make the objects, technical means and advantages of the embodiments of the present invention more apparent, the present invention will be described hereunder by specific embodiments in conjunction with accompanying drawings. The followings are only embodiments of the present invention, but not to limit the spirit of the present invention.

According to the above method for transferring information between at least two systems, the specific processing flow chart of which is shown in FIG. 3, the method includes the following steps.

Step 3-1: A time parameter of a time slice (GAP) for bearing information, an information bearing mode of the time slice and an information transmission mode (such as the repeat period of the time slice/gap) are configured.

Firstly, devices and/or terminals in at least two systems which need inter-system information communication are configured collectively. A state parameter of a GAP for bearing information, information indicated by a state parameter of the GAP and a reference time of the GAP need to be set. The state parameter of the GAP for bearing information includes an insertion time position relative to the reference time of the GAP, a length of the time slice of the GAP and a filling state (empty/full) of the GAP. The state parameter of the GAP may also be represented as positions of boundary points (a position of a start point and a position of an ending point) of the GAP relative to the reference time point and/or a time length of the GAP, the filling state (empty/full) of the GAP. If the state parameter is in multi-value form, the parameter relative to each value needs to be set. The information bearing mode of the GAP refers to the information indicated by a variation of the time parameter of the GAP. The variation of the time parameter includes a variation in the position of the start point of the GAP and/or the degree of the variation, or a variation in the position of the ending point of the GAP and/or the degree of the variation, or the filling state (empty/full) of the GAP. If the variation of the time parameter is in multi-value form, the parameter relative to each assumed value needs to be set. The specific setting method will be further described below.

In a specific embodiment, it is required that the configuration of the parameters can enable the receiving party to detect and extract the information carried in the GAP via at least one method (three detection and determination methods with the time parameter of the GAP for bearing information, the information bearing mode of the GAP and the information transmission mode as provided above). For example, the settings of the transmitting party and the receiving party match each other or are unified so as to facilitate the information communication and compatibility.

Step 3-2: The information to be transferred are divided into information elements suitable for transmission in GAPs according to the information carried in the respective GAP and the information bearing capacities of the respective GAP.

According to the setting in step 3-1, each GAP can bear different amount of information, such as a single bit or multiple bits of information. Therefore the information to be transferred needs to be divided into information elements with capacities corresponding to those of the respective GAPs according to the above setting.

Step 3-3: The information carried in the divided information elements in step 3-2 is borne into corresponding time slices GAPs in the GAP information bearing mode set in step 3-1 in a preset timing by the state parameter of the GAP.

Step 3-4: At the receiving party, the state of each GAP is detected and determined and information borne in each GAP is extracted according to a rule matching the configuration information of the transmitting party in step 3-1.

Step 3-5: The information borne in the respective GAPs is combined at the receiving party in a preset timing corresponding to that of the transmitting part to obtain the information to be transferred.

In case of multiple systems, a unified GAP may be defined in a frame structure in a particular region (such as a national region) by using the above method, and information can be communicated with the common GAP. To prevent or solve a potential conflict, the systems can transmit information/signaling between each other by using successive common GAPs and using a conflict detection and retransmission method or a timeout and retransmission method. Alternatively, periodic GAPs may be divided into a number of periodic channels, for example, each N GAPs being grouped into a period, different GAPs in each period are allocated to different systems for exclusive occupation, and the GAPs in the individual periods allocated to the same system are combined in series to obtain the transferred information.

The setting, bearing and detection modes of a GAP in the above steps will be described herein by way of examples.

(I) A time slice for bearing information and information indicated by a state parameter of the time slice are configured.

An embodiment of the present invention provides a method for transferring information by controlling and detecting a state parameter of a time slice for transmitting a signal. Thus it is necessary to define the time slice for bearing information and the information indicated by the state parameter of the time slice.

(i) The definition of the time slice for bearing information. The embodiment of the present invention may use a time slice existing in a data frame or a newly defined time slice as the time slice for bearing information. For the purpose of easy description, the time slices for bearing information are referred to as "GAPs" in all the embodiments of the present invention.

Herein the GAP may be a difference value between a burst ending time point and a burst start time point of the same or different transmitters, or a difference value between the burst ending time point and a set (well known) time point, or a difference value between a reference time point and the burst start time point. The reference time point may be a time point in a preceding gap or a boundary of the preceding gap, or a time point predefined during the preceding signal transmission without gaps. The time slice includes but is not limited to a time slice between uplink and downlink frames of a Time Division Duplex (TDD) system. For example, in an 802.16 system, the time slice may be a time gap between a downlink burst ending time point and an immediately following uplink burst start time point, i.e., the Transmit/receive Transition Gap (TTG), or a time gap between the last uplink burst ending time point and the uplink burst start time point, i.e., the Receive/transmit Transition Gap (RTG). The time slice may also be the GAP in TD-SCDMA. The time slice may also be a GAP newly added before the start position of a system frame in Frequency Division Duplex (FDD), for example, a GAP originally existing or newly added before the start position of a frame in an XDSL system.

Here the time slice GAP may be: a time slice obtained by using or adjusting a frame gap (the time slice at the boundary or in the internal of a data frame) existing in the original system, or a newly defined time slice. The time length of the GAP can be set according to the time length of the frame to achieve a balance between information rate and overhead of the system frame. In a particular region or national region, the reference time point and time length of the GAP may also be fixed and unified between the systems, frequency bands and modes.

When there is a time slice in the original data frame, the original frame gap may be used as a GAP, or alternatively, the boundaries of the original frame gap may be appropriately modified. Taking a typical TDD data frame as an example, the GAP may be obtained by using the TTG or RTG existing in the TDD data frame, or by bringing forward the start time point of the original TTG or RTG or pushing back the ending time point of the TTG, or modifying both the boundaries of the TTG or RTG As shown in FIG. 4-A, in the frame N1, the original time slice may be used as a GAP. In the frame N2, the start boundary of the TTG is brought forward to form a new GAP. In the frame N3, the start boundary of the RTG is brought forward to form a new GAP. In the frame N4, the ending boundary of the TTG is pushed back to form a new GAP. In the frame N5, the start boundary of the TTG is brought forward while the ending boundary of the TTG is pushed back to form a new GAP. In the frame N6, the start boundary of the TTG is brought forward while the ending boundary of the RTG is brought forward to form two new GAP.

When there is no time slice in the original data frame (such as an FDD downlink frame) or the original time slice does not suitable for bearing information (such as the time slice originally varying between frames of 802.11), a reference time point may be set and then some new GAPs may be defined by reference to the reference time point. The GAPs may be set immediately before or after the reference time point, or be set in a time interval with a particular offset from the reference time point. FIG. 4-B provides a schematic diagram of GAPs defined with respect to a reference time point. As shown in FIG. 4-B, in the frame N1, the reference time point is defined. In the frame N2, a GAP is set immediately before the reference time point. In the frame N3, a GAP is set in a particular time interval before the reference time point. In the frame N4, a GAP is set immediately after the reference time point. In the frame N5, a GAP is set in a particular time interval after the reference time point. In the frame N6, a GAP is set across both sides of the reference time point.

Herein the reference time point may be defined at different particular positions in the original data frame. FIG. 4-C provides a schematic diagram of selecting a reference time point, in which the frame N1 is a typical TDD data frame and the frame N2 is a typical FDD downlink data frame. Also as shown in FIG. 4-C, when there is a time slice in the original data frame, a reference time point (2) may be defined at the start point (1) of the original time slice, the ending point (2) of the original time slice or a middle setting position. No matter whether there is a time slice in the original data frame, a reference time point may be defined at the frame start point (4) of the original data frame, the frame ending point (5) of the original data frame or a frame middle setting position (6).

As shown in FIG. 5 which illustrate schematic diagrams of GAPs defined in several typical types of data frames, the GAPs defined according to the above principles include: a downlink part in typical TDD format (as shown in FIG. 5-A), an uplink part in a typical TDD data frame (as shown in FIG. 5-B), simultaneous uplink and downlink parts in a typical TDD data frame (as shown in FIG. 5-C), a typical FDD data frame (as shown in FIG. 5-D) and a typical competition-based TDD data frame (as shown in FIG. 5-E).

(ii) The Definition of Information Indicated by a Stat Parameter of a Time Slice To bear information in a GAP, a state parameter of the GAP needs to be defined to indicate the information to be carried. Thus different information can be transmitted by GAPs with different states. Herein the state parameter of the GAP includes but is not limited to a boundary time position of the GAP (such as a time position of the start point and/or a time position of the ending point), a time length of the GAP or a filling state of the GAP time interval.

(II) Information is borne in a time slice by the transmitter.

According to the timing of the time slice for bearing information and the state parameter of the time slice as defined above, the transmitter needs to bear information in transmitting signal properties of corresponding time slices, and modify a state parameter of a signal corresponding to the timing part of the time slice by the following way: controlling a difference value between a burst ending time point and a burst start time point, controlling a difference value between the burst ending time point and a well known set time point, or controlling a difference value between a reference time point and the burst start time point, so as to bear the information.

Taking the using of an original time slice as a GAP for bearing information or defining a GAP in a burst frame as an example, refer to the schematic diagram of changing a state parameter of a GAP to bear information as shown in FIG. 6-A. In this Figure, the frame N1 illustrates the initially defined boundaries of the GAP for bearing information. FIG. 6-A shows three examples of information bearing modes as follows. A) In the frame N2, the information is borne by whether the start point of the GAP is delayed or by the state of the degree to which the time position of the start point of the GAP is delayed so as to shorten the length of the GAP. B) In the frame N3, the information is borne by whether the ending point of the GAP is brought forward or by the state of the degree to which the time position of the ending point of the GAP is brought forward so as to bear the information. C) In the frame N4, the information is borne by whether a burst is inserted in the GAP or by the state of the length of the inserted burst so as to shorten the length of the GAP around the reference time. In addition, any combination of the above three methods A), B) and C) can be used to bear information. For example, two information elements are borne respectively with a position state of the start time point and a position state of the ending time point of the same GAP by using the methods A) and B). Alternatively, three information elements are borne respectively with a position state of the start time point, a position state of the ending time point of the same GAP and the state on whether a new burst is inserted in the GAP by using the methods A), B) and C), as shown in FIG. 11-B.

Likewise, for the case that the GAP is modified from the original time slice or newly defined, the method for bearing information is similar. Referring to the example as shown in FIG. 6-B, information can be borne by the following methods: A) delaying the ending time point of the signal transmission before the GAP or newly defining a signal transmission interval to occupy this time period of GAP; B) bringing forward the start time point of the signal transmission after the GAP or newly defining a signal transmission interval to occupy this time interval; and C) inserting a signal transmission interval in the GAP to occupy this time interval. Alternatively, any combination of the methods A), B) and C) can be used to change signal occupation state of the time interval in associated with the GAP. In this way, the information is borne with the signaling bearing GAP, which may be referred to FIG. 11-B.

(III) The receiver extracts the information borne in the time slice.

According to the time slice GAP for bearing information and the state parameter of the time slice GAP as defined above, the receiver needs to extract the information borne in the time slice. Upon receipt of a signal frame containing a GAP bearing information, the receiver extracts the information in the GAP by detecting and determining the state of the GAP.

To determine the state parameter of the GAP, the receiver may detect the signal strength in a signal strength determination interval corresponding to the GAP and determine the borne information. Alternatively, the receiver may determine the information carried in the received GAP according to the boundary values of the GAP, or determine the information carried in the received GAP according to the length value of the GAP.

Propagation delays are different due to the difference between the distances of different devices of the systems from each other and/or multi-path and reflection influence. Therefore there is a difference between the signal timing (the boundary times of the GAP) of the receiving party and that of the transmitting party. Consequently, it is not appropriate to directly take the CAP boundaries defined by the transmitting party for the signal determination interval. Instead, a timing margin needs to be left between the GAP and the signal strength determination interval, and the value of the timing margin needs to be reserved according to practical application range of the system. Three determination methods will be described as follows in conjunction with examples.

(1) In determination method 1, the information in the GAP is determined according to the signal strength in the signal strength determination interval as shown in FIG. 7-A. The signal determination interval in FIG. 7 is a time interval defined according to the timing parameter of the signal bearing GAP while considering a timing margin.

When the type of setting state of the GAP of the transmitting party is double-value, a strength value (such as the logarithm midpoint) between an average minimum value (corresponding to when the idle time received in the GAP is the longest) and an average maximum value (corresponding to when the idle time received in the GAP is the shortest) of the signal strength single gaps detected in the signal determination interval is taken as a determination threshold. If the signal strength is greater than the threshold, it is determined as a full state. If the signal strength is less than the threshold, it is determined as an empty state. The full state and empty state each correspond to a kind of carried information (such as bit 1/0) (as shown in FIG. 7-B). Since the signal strength is generally calculated by using logarithm, reducing the minimum value of the signal strength range to minimum (where it is necessary to ensure all receiving timings have a margin and where the signal detection strength contains only the background noise) will facilitate the improvement of flexibility. For this purpose, the timing margin when the GAP is the longest especially needs to be a positive value but not a deficiency. The timing margin when the GAP is the shortest length a relatively small influence on the result of the signal strength determination.

When the type of setting state of the GAP of the transmitting party is multi-value, referring to the schematic diagram of multi-value GAP detection and determination using a signal intensive determination interval as shown in FIG. 7-C, a determination threshold is selected among various strength values according to a typical average strength value in the single gaps received according to each type of detected states. Multiple determination intervals are determined according to the determination threshold, and the information (such as 0/1/2/3) carried in each GAP is determined according to the interval to which the actually detected strength in the GAP belongs.

Figure 8:
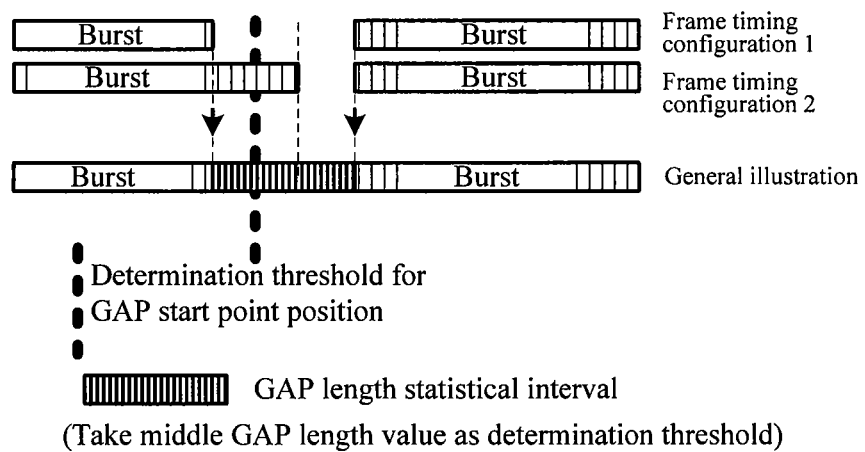
FIG. 8 illustrates determining information carried in a signal bearing GAP by using a start position value of the GAP or the length of the GAP according to an embodiment of the present invention.

(2) In determination method (2), the information carried in the signal bearing GAP is determined by using the time position value of the start point of the GAP or the time length of the GAP as shown in FIG. 8.

For a double-value setting of the transmitting party, a determination threshold position is selected in the middle between the earliest possible value and the latest possible value at a boundary of the GAP (the start time point or ending time point of the GAP), such as an average value of the earliest possible value and the latest possible value, and the information (such as bit 0/1) carried in the GAP is determined according to the anteroposterior relation of the actually received boundary value each time with respect to the determination threshold position. In this method, the two boundary values of the GAP, i.e., the start time point and the ending time point of the GAP can be combined to carry information, or carry information separately, depending on configuration of the transmitting party.

Similarly, if what the GAP of the transmitting party carries is multi-value, as shown in FIG. 11-B, the receiving party needs to determine multiple position intervals corresponding to the transmitting party to determine the information carried in the GAP.

Figure 9:
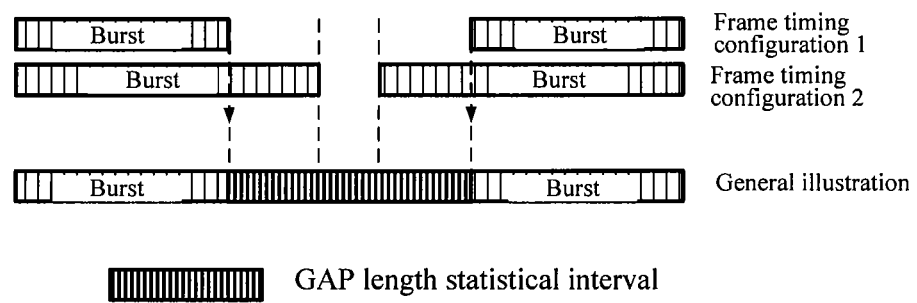
FIG. 9 illustrates determining information carried in a signal bearing GAP by using the length of the GAP according to an embodiment of the present invention.

(3) In determination method (3), as shown in FIG. 8 or FIG. 9, the information carried in the received GAP is determined according to the time length value of the GAP.

For a double-value setting of the transmitting party, a determination threshold position is selected in the middle between the longest value and the shortest value set for the GAP, such as an average value of the following two values. As shown in FIG. 9, a middle value between the two lengths for the GAP is taken as the determination threshold. The information (such as bit 0/1) carried in the actually received GAP each time is determined according to the length value of the GAP with respect to the length of the determination threshold. In this method, both of the boundary values of the GAP, i.e., the start time point and the ending time point of the GAP are combined to carry the information.

Similarly, if what the GAP of the transmitting part carries is multi-value, the receiving party needs to determine multiple length intervals correspondingly to the transmitting party to determine the information carried in the GAP.

The method provided in this embodiment will be further described in the following in conjunction with an actual application scenario.

(I) System Configuration

For example, a signal element carrying information in an actual system is generally a symbol or a code chip, and thus is abbreviated as symbol/code chip or signal element. The illustrative example of a method for transferring information between multiple systems as shown in FIG. 10 briefly illustrates the representation methods for several timings as follows. A) There are continuously transmitted symbols/code chips immediately at both sides of the GAP (such as the N1 shown in FIG. 10. B) There are continuously transmitted symbols/code chips immediately at one side of the GAP with a single-signal element length, and there is a fixed GAP at the other side (such as the N2 or N4 in FIG. 10). C) There are continuously transmitted symbols/code chips immediately at one side of the GAP with a multi-signal element length, and there is a fixed GAP at the other side (such as the N3 or N4 in FIG. 10). D) There is a fixed GAP at both sides of the GAP (such as the N5 in FIG. 10).

Taking the case that multiple inter-system modulation methods are different as an example, when the actual multiple inter-system modulation methods are different, it is necessary to configure relative parameters respectively for the GAPs of the multiple systems. The configuration of the parameters is required to enable all the respective systems to detect the information carried in the GAPs by at least one method.

The requirements for various transmitting party configurations in receiving by the various methods will be described in the following with specific examples.

As shown in FIG. 11-A, when all the receiving parties use the position of a boundary point (such as the start time point) of a GAP to determine the information carried in the GAP, it is required that the GAP boundary of the transmitting party still keeps the relative anteroposterior relation with the determination time setting point of the receiving parties after suffering a propagation delay. Taking the start time point of the GAP as an example, assuming that the devices of the systems are synchronized with each other, the propagation delay has a maximum value of 10 us and a minimum value of 0.5 us, and a margin for determination precision is 10 us, a margin greater than 10+10=20 us needs to be reserved for the minimum value of the GAP start time point set by each type of system upon the transmission relatively before the determination time point, and the maximum value of the GAP start time point as set needs to be relatively behind the determination time point by (−0.5+10)=9.5 us.

Similarly, if the GAP of the transmitting party has a multi-value setting (see FIG. 11-B), each setting value of the GAP and the correspondence relation of each setting value also need to comply with the requirements for making a correct determination according to the propagation delay and the determination precision with respect to the individual determination position time points. As shown in FIG. 11-B, (in the multi-value case) information is transferred between hybrid systems by using a GAP start position value.

When the length of a GAP is used to determine the information carried in the GAP (see FIG. 11-C), the timing analysis varies with the relative positions of the transmitting parties from the sides of the GAP. Assuming that the transmitting parties at the sides of the GAP are the same, the length of the GAP has no relation to the propagation delay. It should be noted that in assuming the value of the threshold determination length, taking double-value setting/determination as an example, when the systems have different GAP length ranges due to the different lengths of the signal elements, it is necessary to ensure that the minimum value of the longest GAP length setting among the systems is greater than the maximum value of the shortest GAP length setting among the systems. It is also necessary to ensure sufficient determination. A critical determination length value is selected in the middle of (the maximum value of the shortest GAP length setting, the minimum value of the longest GAP length setting) of the systems. For example, if three systems respectively have double values of their GAP length settings as (200 us, 100 us), (200 us, 50 us) and (180 us, 75 us), the determination length value needs to be selected between (180 us, 100 us), such as 140 us.

FIG. 11-D illustrates another embodiment of transferring information between hybrid systems by using GAP length setting and determination. In the case of carrying information with a length determination GAP, the transmission setting method is similar with the method of setting the determination length value under the case that both side boundaries of the GAP are set to be variable.

FIG. 11-E illustrates a schematic diagram of transferring information between hybrid systems by using GAP start point setting and signal strength detection and determination. When using signal strength determination, the signaling determination interval does not overlap with the range of the signal bearing GAP, and is set according to the flexibility requirement of the signal. It is assumed that the times of the individual systems are synchronized and the GAP ending time points of three hybrid systems are collectively at 200 us, and that the GAP start time points of the three systems are double-value settings (0, 100), (0, 150) and (12.5, 125) respectively. It is also assumed that the propagation delay is between 1 us to 10 us without considering the precision margin.

To ensure the flexibility, considering the property of logarithm calculation, firstly, it is needed to ensure that in the systems, all the signal intensities at the receiving parties reach the minimum values at the earliest settings (empty state) of the GAP start point positions. Therefore the value of the left boundary of the signaling determination interval needs to be above 12.5+10=22.5 us (the maximum value among the minimum values of the GAP start time points plus a maximum delay) which corresponds to the worst condition, meanwhile the value of the right boundary of the signaling determination interval needs to below 200 us necessarily.

Considering that the proportions of the signal intensities at the receiving party to the minimum values thereof should be as large as possible at the latest settings (empty state) of the GAP start point positions in the systems, the signaling determination interval should be as large as possible. Moreover, the signaling determination interval should be between a time point 100+1=101 us (the minimum value among the maximum values of the GAP start time points plus a minimum delay) commonly exceeded by the start time points of the systems and another time point 150+10=160 us (the maximum value among the minimum values of the GAP start time points plus a maximum delay) at most reached by the start time points. The optimal value depends on signal strength noise and receiver flexibility. Under this constraint, the signaling determination interval may be selected as (22.5 us, 150 us) for example as actually required.

Certainly, the difference in granularities of signaling determination setting will result in different in the intervals available to be set. For example, if the granularities set in the three systems are 100 us, 50 us and 12.5 us, respectively, the optimal signaling determination interval should be selected as actually required. For example, the systems which are configured with signaling determination intervals respectively as (0 us, 200 us), (50 us, 150 us) and (25 us, 150 us), normally determine the information carried in the GAP in flexibility as high as possible.

A method for information transmission between communication systems according to an embodiment of the present invention will be described in the following in conjunction with an application example.

FIG. 12 shows wireless access communication systems A, B and C which each have their base stations and terminals subscribing thereto. A terminal in a region where signals of neighboring systems overlap with each other can receive a signaling message (Sig) from a base station of a neighboring system by using the above method. Such a terminal can also transmit a signaling message to a base station of a neighboring system by using the above method. With the cooperation of these signaling messages and associated mechanisms, functions such as measurement and identification of inter-system interference, interference prevention and removing, air interface resource allocation and dynamic resource negotiation, allocation and management, power negotiation, automatic network planning, state information exchange, neighboring station discovery, traffic allocation and negotiation, terminal single-mode handoff, terminal multi-mode handoff and transmission of a small amount of other data and information can be implemented.

Figure 13:
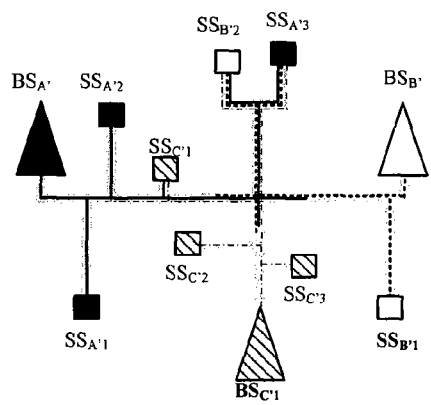
FIG. 13 is a diagram illustrating an application example in a wire neighborhood system according to an embodiment of the present invention.

Similarly, FIG. 13 shows wire PMP access systems (copper wire/copper cable systems, such as cable, PLC/BPL; optical systems, such as xPON) A', B' and C' which each have their base stations and terminals subscribing thereto. A terminal in a region where signals of neighboring systems commonly reach can receive a signaling message from a base station of a neighboring system by using the above method. Such a terminal can also transmit a signaling message to a base station of a neighboring system by using the above method. With the cooperation of these signaling messages and associated mechanisms, functions such as measurement and identification of inter-system interference, interference preventing and removing, resource allocation and dynamic resource negotiation, allocation and management, power negotiation, automatic network planning, state information exchange, neighboring station discovery, traffic allocation and negotiation, terminal single-mode handoff, terminal multi-mode handoff and transmission of a small amount of other data and information can be implemented.

Figure 14:
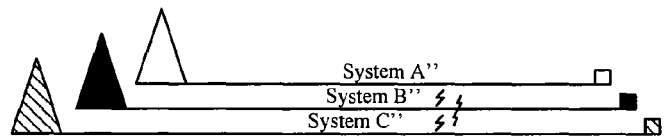
FIG. 14 is a diagram illustrating an application example in a wire neighborhood system according to an embodiment of the present invention.

FIG. 14 shows wire access systems (such as xDSL systems) A", B" and C" which each have their base stations and terminals subscribing thereto. There is no wire connection for signals between neighboring systems. However, the signal leakage of the systems will result in inter-system interference. Moreover, since the uplink and downlink of the systems are synchronized, the base stations of each system will generate crosstalk to the terminals of other systems while the terminals of each system will also generate crosstalk to the base stations of other systems. The base stations of each system can transmit signaling to the terminals of the neighboring systems or the terminals of each system can transmit signaling to the base stations of the neighboring systems by using the above method. With the cooperation of the signaling and associated mechanisms, functions such as measurement and identification of inter-system interference, interference preventing and removing, resource allocation and dynamic resource negotiation, allocation and management, power negotiation, state information exchange, and transmission of a small amount of other data and information can be implemented.

To facilitate the understanding of those skilled in the art, illustrative examples will be described below. The following examples are applicable to the above three cases. To simplify the description, the systems A, B and C are taken for example below. In addition, it is assumed that the modulation methods of the respective systems are not exactly the same and all the systems commonly use the boundary position determination method. The synchronization errors between the systems can be omitted.

Figure 15:
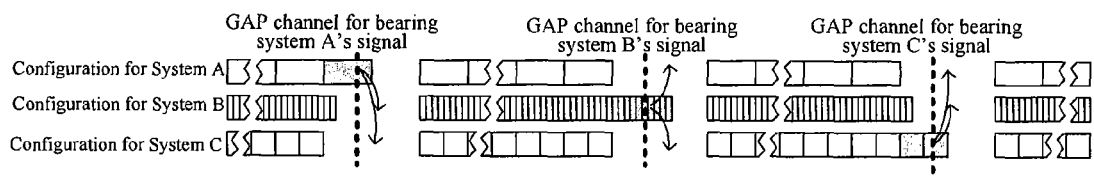
FIG. 15 is an example of the systems transmitting signaling to neighboring systems by respectively using a signaling bearing GAP in a cyclic period according to an embodiment of the present invention.

FIG. 15 illustrates an example of the systems each transmitting signaling to neighboring systems by periodically using a part of signaling bearing GAPs in a cyclic period.

A common cyclic period can be defined in which each system is allocated with a signaling bearing GAP. In this example, there are three systems, that is, three GAPs are allocated in each cyclic period, each of the systems occupying one of the three GAPs (in a practical application, more than one GAP can be allocated to a system in a cyclic period). Each system keeps the states set as empty in the GAPs not occupied by the system. Each system can transmit the signaling in multiple periods to a neighboring system with the GAPs occupied by the system depending on the state on whether a boundary position of each GAP is set before or after the receiving position determination point (which requires sufficient timing margins respectively between the two boundary positions and the receiving position determination point) when transmitting the signal.

Figure 16:
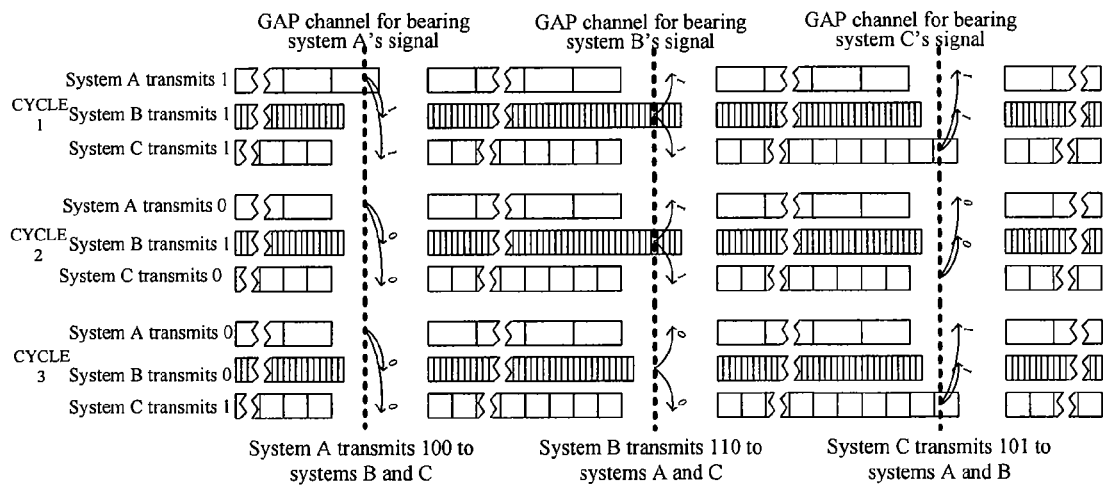
FIG. 16 is an actual example diagram illustrating the systems transmitting signaling respectively to neighboring systems according to an embodiment of the present invention.

FIG. 16 is an actual timing example diagram illustrating multiple systems transmitting signaling respectively to neighboring systems using the above method.

For example, system A transmits "100" to its neighboring systems B and C, system B transmits "110" to its neighboring systems A and C, and system C transmits "101" to its neighboring systems A and B. It is assumed that the full state is represented as "1" and the empty state is represented as "0". In the three periods, system A sets the GAP states in its signaling bearing GAPs as full, empty and empty respectively, while systems B and C set empty states in the same GAP positions; system B sets the GAP states in its signaling bearing GAPs as full, full and empty respectively, while systems A and C set empty states in the same GAP positions; system C sets the GAP states in its signaling bearing GAPs as full, empty and full respectively, while systems A and B set empty states in the same GAP positions. In this way, the systems can successfully transmit the signaling to their respective neighboring systems.

Figure 17:
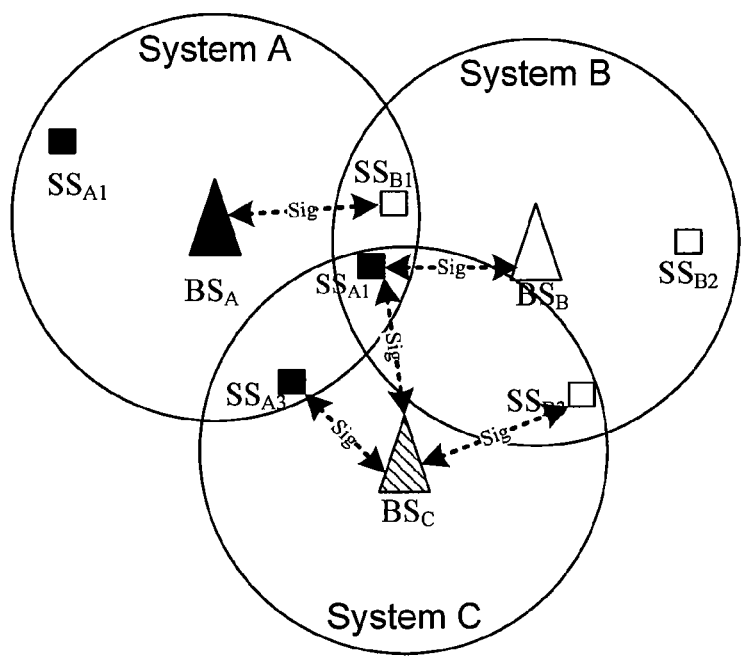
FIG. 17 is a diagram illustrating an application example in a wireless neighborhood system according to an embodiment of the present invention.

With respect to the system as shown in FIG. 12, FIG. 17 is another application example in a wireless context, and illustrates that a system can transmit a signaling message to its neighboring systems using a GAP with no normal service data to be received or transmitted. It is assumed that there are still three systems, in which systems A and B have normal service data received and transmitted while system C is in a state that no normal service data is received or transmitted at the proximity of the GAP.

Figure 18:
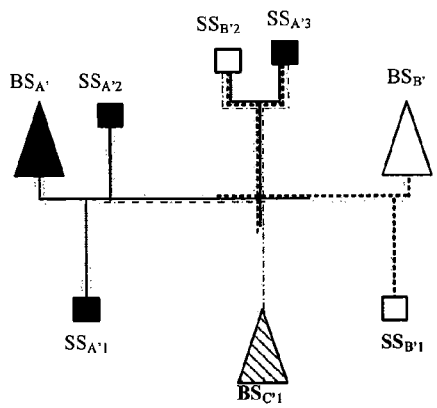
FIG. 18 is a diagram illustrating an application example in a wire neighborhood system according to an embodiment of the present invention.
Figure 19:
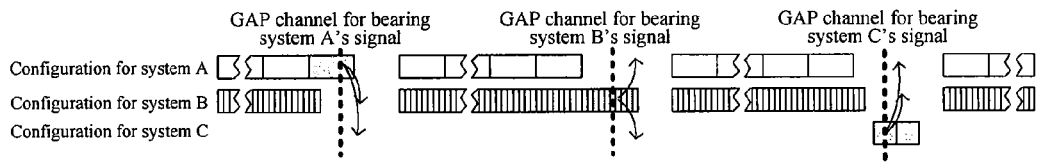
FIG. 19 is an example in which a system without data to be transmitted or received at the proximity of a GAP transmits signaling by using a signaling bearing GAP according to an embodiment of the present invention.

With respect to the system as shown in FIG. 13, FIG. 18 is another application example in a wire context, and illustrates that a system can transmit a signaling message to its neighboring systems using a GAP with no normal service data to be received or transmitted. It is assumed that there are still three systems, in which systems A' and B' have normal service data received and transmitted while system C' is in a state that no normal service data is received or transmitted at the proximity of the GAP.

With respect to FIG. 14, it can also be assumed that system C" is in a condition that no normal service data is received or transmitted at the proximity of a signaling bearing GAP while system C" needs to transmit signaling to its neighboring systems.

The following specific applications of the methods all are applicable to the above three cases. To simplify the description, the systems A, B and C are taken for example below. In addition, it is assumed that the modulation methods of the respective systems are not exactly the same and all the systems commonly use the boundary position determination method. The synchronization errors between the systems can be omitted. A common cyclic period can be defined in which each system is allocated with a signaling bearing GAP. In the example as shown in FIG. 15, there are three systems, that is, three GAPs are allocated in each cyclic period, each of the systems occupying one of the three GAPs (in a practical application, more than one GAP can be allocated to a system in a cyclic period). Each system keeps the GAPs which are not occupied by the system itself empty. Each system can segment the signaling into multiple periods in the GAPs occupied by the system depending on the state on whether a boundary position of each GAP is set before or after the receiving position determination point (which requires sufficient timing margins respectively between the two boundary positions and the receiving position determination point) when transmitting the signal, and then transmit the signaling to a neighboring system. It should be noted that, in the method for system C to bearing information in a GAP, system C will transmit a number of signal elements using the time intervals of the GAP as the full state, and other receiving parties can determine the information carried in the GAP according to the variation in the GAP start position before the ending point of the original GAP or the length of the GAP or the signal strength in the signal determination interval.

Figure 20:
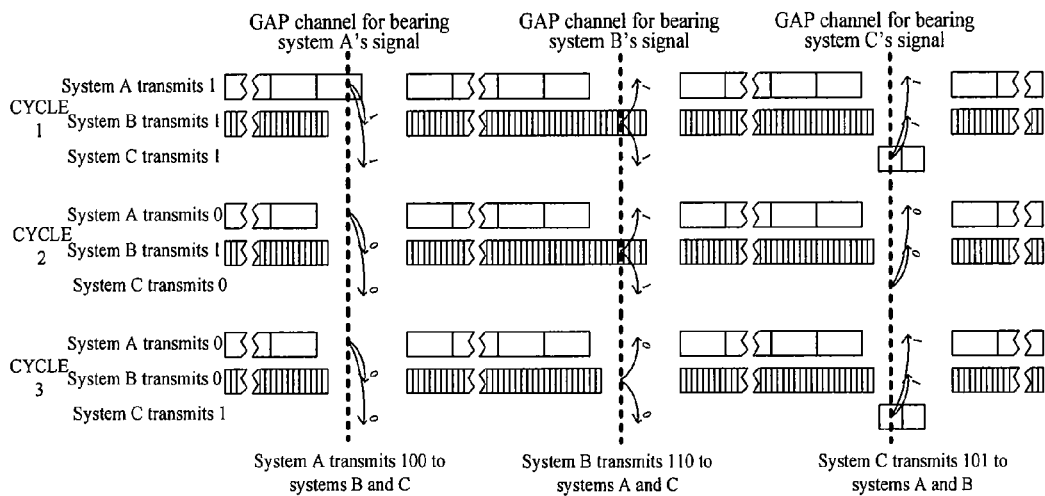
FIG. 20 is an example in which a system without data to be transmitted or received at the proximity of a GAP transmits signaling by using a signaling bearing GAP according to an embodiment of the present invention.

Similar with FIG. 16, FIG. 20 illustrates specific steps for bearing signaling with GAPs in multiple periods. It is assumed that system A transmits "100" to its neighboring systems B and C, system B transmits "110" to its neighboring systems A and C, and system C transmits "101" to its neighboring systems A and B. It is also assumed that the full state is represented as "1" and the empty state is represented as "0". In the three periods, system A sets the GAP states in its signaling bearing GAPs as full, empty and empty respectively, while systems B and C set empty states in the same GAP positions; system B sets the GAP states in its signaling bearing GAPs as full, full and empty respectively, while systems A and C set empty states in the same GAP positions; system C sets the GAP states in its signaling bearing GAPs as full, empty and full respectively, while systems A and B set empty states in the same GAP positions. In this way, the systems can successfully transmit the signaling to their respective neighboring systems. It should be noted that at this time, no signal is transmitted in and besides the signaling bearing GAP of system C when the GAP state of system C is empty, and a number of specific signaling signal elements are transmitted in parts of time in the interval between the boundary of the GAP when the GAP state of system C is full.

In addition, an embodiment of the present invention further provides a transmitter, including: a time device, a time slice generation device and a transmitting device. The time device is configured to determine a reference time. The time slice generation device is configured to insert a time slice signal into a particular time position in a data frame according to a bit property of data to be transmitted and the reference time. The transmitting device is configured to transmit the data frame in which the time slice signal is inserted and the time slice signal.

Preferably, the transmitter may also include: a time slice parameter control device configured to control a state parameter of the time slice signal in the time slice generation device according to the bit property of the data to be transmitted.

Preferably, the transmitter may also include: a time slice parameter control device and a block dividing device. The purpose and function of the time slice parameter control device may be referred to the above description. The block dividing device is configured to divide the data to be transmitted into multiple data sub-blocks to be transmitted and input each of the data sub-blocks to be transmitted to the time slice generation device.

Correspondingly, an embodiment of the present invention also provides a receiver. The receiver includes a first time device, a time slice detection device and a determination device. The first time device is configured to determine a reference time corresponding to a transmitter. The time slice detection device is configured to receive a data frame in which a time slice signal is inserted and the time slice signal transmitted from the transmitter, and detect a state parameter of the time slice signal. The determination device is configured to parse the data frame according to the detected state parameter of the time slice signal.

Preferably, if the data is parsed out as data sub-blocks, the receiver further includes a combining device. The combining device is configured to combine the received data sub-blocks transmitted by the determination device into complete data according to a timing.

The procedures for implementing the purposes and functions of the devices of the transmitter and the receiver may be referred to the above described procedures for implementing the respective steps in the above methods or application embodiments, and thus will not be repeated herein.

In addition, an embodiment of the present invention further provides a transmission system. The system at least includes a transmitter and a receiver. The transmitter is configured to determine a reference time, insert a time slice signal into a data frame according to the reference time, and transmit the data frame and the time slice signal. The receiver is configured to determine a reference time corresponding to the transmitter, and after receiving the data frame and the time slice signal, detect a state parameter of the time slice signal and parse the data frame according to the state parameter.

The transmitter includes a time device, a time slice generation device and a transmitting device. The transmitter may further include a time slice parameter control device, or include a time slice parameter control device and a block dividing device. The purposes and functions of the devices may be referred to the above description and will not be repeated herein.

The receiver includes a first time device, a time slice detection device and a determination device. The receiver may further include a combining device. The purposes and functions of the devices may be referred to the above description and will not be repeated herein.

It should be noted that in the embodiments of the present invention, the terms "data" and "data frame" may have the same meaning in some application contexts.

The above description illustrates preferred embodiments of the present invention, but not intends to limit the scope of protection of the present invention. Any modification, alternation and improvement are intended to be included in the scope of protection of the present invention as long as they fall into the spirit and principle of the present invention.

What is claimed is:

1. A transmitter comprising:
a time device, configured to determine a reference time point in a data frame or at a boundary of the data frame;
a time slice generation device, configured to insert a time slice carrying information to be transmitted into a data frame at a particular time position with reference to the reference time point according to a bit property of the information carried in the time slice;
a time slice parameter control device, configured to set a state parameter of the time slice in the time slice generation device according to the bit property of the information carried in the time slice; and
a transmitting device, configured to transmit the data frame and the time slice.

2. The transmitter according to claim 1, wherein the transmitter further comprises:
a block dividing device, configured to divide the information to be transmitted into multiple data sub-blocks, and input each of the data sub-blocks to the time slice generation device.

3. A receiver comprising:
a first time device, configured to determine a reference time point corresponding to a transmitter;
a time slice detection device, configured to receive a data frame in which a time slice carrying information to be transmitted is inserted, with a state parameter of the time slice being set according to a bit property of the information carried in the time slice, transmitted from the transmitter, and to detect the state parameter of the time slice; and
a determination device, configured to parse the time slice according to the detected state parameter of the time slice to get the information carried in the time slice.

4. The receiver according to claim 3, wherein if the information is parsed out as data sub-blocks, the receiver further comprises:
a combining device, configured to combine the received data sub-blocks transmitted by the determination device into complete data according to a timing.

5. A transmission method comprising:
determining, by a transmitter, a reference time point in a data frame or at a boundary of the data frame;
inserting, by the transmitter, a time slice carrying information to be transmitted into a data frame at a particular time position with reference to the reference time point according to a bit property of the information carried in the time slice;
setting, by the transmitter, a state parameter of the time slice carrying the information to be transmitted according to the bit property of the information carried in the time slice; and
transmitting, by the transmitter, the data frame and the time slice.

6. The transmission method according to claim 5, wherein the inserting, by the transmitter, of the time slice carrying information to be transmitted, comprises:
modulating a boundary position of the time slice and/or a time length of the time slice according to the bit property of the information carried in the time slice and the reference time point; and
inserting the modulated time slice into the particular time position of the data frame.

7. The transmission method according to claim 5, wherein the determining, by the transmitter, of the reference time point in the data frame or at the boundary of the data frame, comprises:
determining the reference time point according to a frame head or a frame tail of the data frame; or
determining the reference time point according to a synchronization clock and/or a synchronization signal.

8. The transmission method according to claim 7, wherein the inserting, by the transmitter, of the time slice carrying information to be transmitted, comprises:
determining a boundary of the data frame or a middle position of the data frame as the particular time position according to the reference time point which is determined according to the frame head or frame tail of the frame, and inserting the time slice at the determined particular time position; or
determining a position at a fixed distance away from a synchronization position as the particular time position according to the synchronization clock and/or the synchronization signal, and inserting the time slice at the determined particular time position.

9. The transmission method according to claim 5, wherein the state parameter of the time slice comprises at least one of the followings: an insertion time position or positions of boundary time position points of the time slice relative to the reference time point, a length of the time slice, and a filling state of the time slice.

* * * * *